US009569681B2

(12) United States Patent
Bala et al.

(10) Patent No.: US 9,569,681 B2
(45) Date of Patent: Feb. 14, 2017

(54) METHODS AND SYSTEMS FOR EFFICIENT IMAGE CROPPING AND ANALYSIS

(71) Applicant: Xerox Corporation, Norwalk, CT (US)

(72) Inventors: Raja Bala, Pittsford, NY (US); Aaron M. Burry, Ontario, NY (US)

(73) Assignee: Xerox Corporation, Norwalk, CT (US)

(*) Notice: Subject to any disclaimer, the term of this patent is extended or adjusted under 35 U.S.C. 154(b) by 331 days.

(21) Appl. No.: 14/249,809

(22) Filed: Apr. 10, 2014

(65) Prior Publication Data
US 2015/0294175 A1  Oct. 15, 2015

(51) Int. Cl.
G06K 9/32 (2006.01)
G06T 3/00 (2006.01)
G06T 7/00 (2006.01)

(52) U.S. Cl.
CPC ............ G06K 9/325 (2013.01); G06T 3/00 (2013.01); G06T 7/0042 (2013.01); G06T 2207/20021 (2013.01); G06T 2207/20132 (2013.01)

(58) Field of Classification Search
None
See application file for complete search history.

(56) References Cited

U.S. PATENT DOCUMENTS

| 6,249,609 | B1* | 6/2001 | Sunakawa | G06K 9/00456 382/232 |
| 2004/0247204 | A1* | 12/2004 | Lim | G06K 9/00463 382/298 |
| 2005/0196043 | A1* | 9/2005 | Jung | G06K 9/325 382/176 |
| 2007/0058863 | A1* | 3/2007 | Boregowda | G06K 9/3258 382/170 |
| 2008/0037869 | A1* | 2/2008 | Zhou | G06T 7/0081 382/173 |
| 2010/0060665 | A1* | 3/2010 | Wang | G09G 5/391 345/660 |
| 2010/0156931 | A1* | 6/2010 | Boreham | G06T 11/60 345/621 |
| 2011/0158517 | A1* | 6/2011 | Dai | G06K 9/32 382/165 |

(Continued)

OTHER PUBLICATIONS

Azad, Reza, Fatemeh Davami, and Babak Azad. "A novel and robust method for automatic license plate recognition system based on pattern recognition." Advances in Computer Science: an International Journal 2, No. 3 (2013): 64-70.*

(Continued)

Primary Examiner — Sumati Lefkowitz
Assistant Examiner — Carol Wang
(74) Attorney, Agent, or Firm — MH2 TECHNOLOGY LAW GROUP LLP

(57) ABSTRACT

A system and method for cropping a license plate image to facilitate license plate recognition by obtaining an image that includes the license plate image, dividing the image into multiple sub-blocks, computing an activity measure for each sub-block; determining an activity threshold, determining that a sub-block is an active sub-block by comparing the activity measure for the sub-block with the activity threshold, generating a second image of the license plate information, where the second image includes the active sub-block, and obtaining the license plate information based on the second image.

20 Claims, 6 Drawing Sheets

(56) References Cited

U.S. PATENT DOCUMENTS

| | | | |
|---|---|---|---|
| 2012/0045147 A1* | 2/2012 | Liu | G06K 9/325 382/282 |
| 2012/0155754 A1* | 6/2012 | Chen | G06K 9/00456 382/164 |
| 2012/0250985 A1* | 10/2012 | Xiao | G06K 9/00456 382/164 |
| 2013/0108175 A1* | 5/2013 | Ptucha | G06T 11/60 382/199 |
| 2013/0272579 A1 | 10/2013 | Burry et al. | |
| 2015/0302551 A1* | 10/2015 | Huang | G06T 3/0012 382/199 |

OTHER PUBLICATIONS

Anagnostopoulos, Christos Nikolaos E., Ioannis E. Anagnostopoulos, Vassili Loumos, and Eleftherios Kayafas. "A license plate-recognition algorithm for intelligent transportation system applications." Intelligent Transportation Systems, IEEE Transactions on 7, No. 3 (2006): 377-392.*

Keslassy, Isaac, Mark Kalman, Daniel Wang, and Bernd Girod. "Classification of compound images based on transform coefficient likelihood." In Image Processing, 2001. Proceedings. 2001 International Conference on, vol. 1, pp. 750-753. IEEE, 2001.*

Zhang, Yi, and Tat-Seng Chua. "Detection of text captions in compressed domain video." In Proceedings of the 2000 ACM workshops on Multimedia, pp. 201-204. ACM, 2000.*

Mester, Rudolf, and Uwe Franke. "Spectral entropy-activity classification in adaptive transform coding." IEEE Journal on Selected Areas in Communications 10, No. 5 (1992): 913-917.*

Shivakumara, Palaiahnakote, Trung Quy Phan, and Chew Lim Tan. "A robust wavelet transform based technique for video text detection." In 2009 10th International Conference on Document Analysis and Recognition, pp. 1285-1289. IEEE, 2009.*

Qiya, Zhou, Yu Xunquan, He Lian, and Yang Gaobo. "Character Extraction of Vehicle Plate Directly from Compressed Video Stream." In International Conference on Applied Informatics and Communication, pp. 566-573. Springer Berlin Heidelberg, 2011.*

Shin, Hyun-Kyung. "Fast Text Line Segmentation Model Based on DCT for Color Image." The KIPS Transactions: PartD 17, No. 6 (2010): 463-470.*

Jang, Ick Hoon, Chong Heun Kim, and Nam Chul Kim. "Region analysis of business card images acquired in PDA using DCT and information pixel density." In International Conference on Advanced Concepts for Intelligent Vision Systems, pp. 243-251. Springer Berlin Heidelberg, 2005.*

AlKhateeb, Jawad Hasan Yasin. "Word based off-line handwritten Arabic classification and recognition. Design of automatic recognition system for large vocabulary offline handwritten Arabic words using machine learning approaches." PhD diss., University of Bradford, 2010.*

\* cited by examiner

METHODS AND SYSTEMS FOR EFFICIENT IMAGE CROPPING AND ANALYSIS

TECHNICAL FIELD

The present disclosure relates generally to methods, systems, and computer-readable media for cropping images for license plate recognition.

BACKGROUND

Automated license plate recognition (hereinafter, "ALPR") generally refers to an automated process for applying optical character recognition (hereinafter, "OCR") techniques to images captured by traffic cameras to recognize vehicle license plate information.

ALPR technology is useful for law enforcement and other purposes, allowing for mass surveillance of vehicle traffic for a variety purposes at very low personnel costs. ALPR technology can be utilized concurrently with a variety of law enforcement procedures, such as techniques for determining vehicle speed, monitoring traffic signals, electronic toll collection, and individual vehicle surveillance.

ALPR methods can involve three steps. The first step can be determining the location of the license plate in the image (hereinafter, "plate localization"). The second step can be separating the individual characters on the license plate from the remainder of the image (hereinafter, "character segmentation"). The third step can be applying OCR techniques to the segmented characters.

The challenge for character segmentation is to provide a robust, highly accurate solution that is also computationally efficient. Accordingly, to minimize computational load and reduce extraneous noises present in captured images, it is common to identify a tight bounding box sub-image (hereinafter, "tight bounding box" or "TBB") that surrounds the license plate characters prior to character segmentation.

However, extracting a tight bounding box sub-image can be a challenging task due to variations in image quality, noise, tilt of captured license plate images, etc.

Accordingly, APLR technology may be improved by techniques for efficiently identifying and/or extracting a tight bounding box that surrounds license plate characters in a captured image.

SUMMARY

The present disclosure relates generally to methods, systems, and computer readable media for providing these and other improvements to APLR technology.

Implementations of the present teachings relate to methods for obtaining license plate information from an image. In some embodiments, a computing device can obtain an image that includes a license plate image, divide the image into multiple sub-blocks, compute a spatial activity measure for each sub-block; determine an activity threshold, determine that a sub-block is an active sub-block by comparing the spatial activity measure for the sub-block with the activity threshold, generate a second image of the license plate, where the second image includes the active sub-block, and obtain the license plate information based on the second image.

In certain implementations, the image that is obtained can generated by the computing device by vertically cropping a previous image to remove parts of the image above and below the license plate and/or removing tilt of the license plate within the image.

In some embodiments, the computing device can perform a frequency analysis on each sub-block, where the spatial activity measure for each sub-block is based on the frequency analysis of that sub-block.

In further embodiments, the computing device can generate an activity profile for the image based on the spatial activity measure for each sub-block, where the activity threshold is based on the activity profile.

In other embodiments, the computing device can determine that a second sub-block is an inactive sub-block by comparing the spatial activity measure for the second sub-block with the activity threshold, where the second image includes the active sub-block but does not include the inactive sub-block. Alternatively or additionally, the computing device can determine that a third sub-block is an inactive sub-block by determining that the third sub-block is between an inactive sub-block and an edge of the image.

In still further embodiments, the computing device can determine that a second sub-block is a second active sub-block by determining that the second sub-block is between the active sub-block and a third active sub-block in the image.

In other embodiments, the computing device can determining a third image of the license plate that includes only active sub-blocks, determine that the third image is over-cropped with respect to the license plate information by comparing a ratio of the third image with an expected license plate ratio. Based on such a determination, the computing device can generate the second image, where the second image includes one or more inactive sub-blocks in addition to the active sub-block.

In further embodiments, the computing device can compute the spatial activity measure using the formula:

$$a_{ij} = \sum_{k \cdot l(k+l>0)} |C_{kl}|^2$$

where $C_{kl}$ represents resultant coefficients of a two-dimensional discrete cosine transform performed on a sub-block $B_{ij}$, and $a_{ij}$ represents the spatial activity measure for the sub-block $B_{ij}$.

Implementations of the present teachings relate to computer systems for obtaining license plate information from an image. In embodiments, the systems include one or more memory devices storing instructions, and one or more processors coupled to the one or more memory devices. The one or more processors are configured to execute the instructions to perform methods and operations. The methods and operations include obtaining an image that includes a license plate image, dividing the image into multiple sub-blocks, computing a spatial activity measure for each sub-block; determining an activity threshold, determining that a sub-block is an active sub-block by comparing the spatial activity measure for the sub-block with the activity threshold, generating a second image of the license plate, where the second image includes the active sub-block, and obtaining the license plate information based on the second image.

Implementations of the present teachings also relate to computer readable storage media storing instructions. The instructions cause one or more processors to perform methods and operations for obtaining license plate information from an image. The methods and operations include obtaining an image that includes a license plate image, dividing the image into multiple sub-blocks, computing a spatial activity measure for each sub-block; determining an activity threshold, determining that a sub-block is an active sub-block by comparing the spatial activity measure for the sub-block with the activity threshold, generating a second image of the license plate, where the second image includes the active sub-block, and obtaining the license plate information based on the second image.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
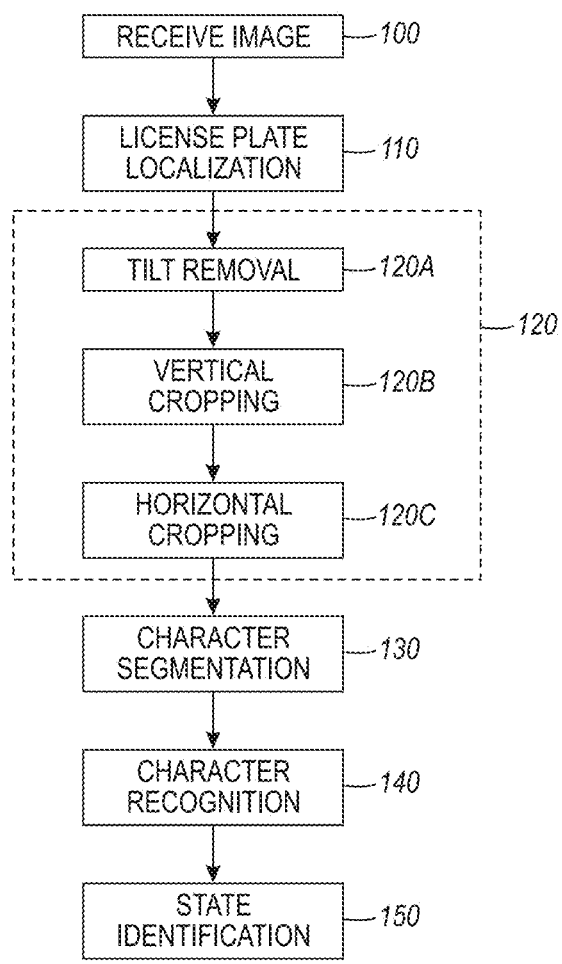
FIG. 1 is a flow diagram illustrating an exemplary method of performing license plate recognition, consistent with certain disclosed embodiments.

The following detailed description refers to the accompanying drawings. Wherever possible, the same reference numbers are used in the drawings and the following description refers to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

FIG. 1 is a flow diagram illustrating an exemplary method of performing license plate recognition, consistent with certain disclosed embodiments. The process can begin in 100 when a computing device receives an image that includes a depiction of a license plate of a vehicle. For example, the computing device can receive the image from a traffic camera. As used herein, an image may refer to a single image, multiple images, or a video captured by a camera. The image can additionally include part of the vehicle and/or background scenery and objects. In some embodiments, the computing device can directly be connected to and/or integrated with the traffic camera, while, in further embodiments, the computing device can be remote to the traffic camera, and receive the images, directly or indirectly, via a network connection.

In 110, the computing device can perform license plate localization to determine the license plate location within the image using various methods known in the art, including, but not limited to, edge detection, image-based classification, and binarization. In some embodiments, the computing device can calculate and store the license plate location in association with the image or as metadata included with the image. The license plate location can be stored as, for example, pixel locations of the edges of the license plate. Hereinafter, reference will be made to an image, which can include either a cropped and/or an uncropped form of the image.

In 120, the computing device can identify and extract a tight bounding box surrounding the license plate characters. In some embodiments, extracting a tight bounding box can include tilt removal 120A, vertical cropping 120B, and horizontal cropping 120C.

In embodiments, tilt removal 120A can be used to adjust perspectives of license plate data. For example, in many implementations, traffic cameras may capture images of license plates at various different angles. The various tilts in the license plate data caused by capturing the license plates at various different angles can create challenges with processing the license plate data. Accordingly, tilt removal 120A can be used to standardize the perspective of the license plates, facilitating ALPR processing. Tilt removal 120A can be performed using various methods known in the art.

In embodiments, vertical cropping 120B can be used to adjust the image vertically to remove image data below and above the license plate location. For example, the computing device can detect a license plate top edge and/or the top of license plate text and crop out all image data that is above that point. Similarly, the computing device can detect a license plate bottom edge and/or the bottom of license plate text and crop out all image data that is below that point. Accordingly, only a horizontal strip of the image that includes the license plate may remain.

In embodiments, horizontal cropping 120C can be used to adjust the remaining horizontal strip to remove image data to the left and to the right of the license plate location. Horizontal cropping 120C may be performed using a frequency based method, such as the method described below in reference to FIG. 2. The image remaining after cropping can be the extracted tight bounding box.

In 130, the computing device can segment the characters on the license plate in the extracted tight bounding box. In some embodiments, the computing device can analyze the extracted tight bounding box and separate the extracted tight bounding box into smaller segments containing individual characters using methods and systems known in the art.

In 140, the computing device can perform known methods of character recognition, such as OCR, on the segmented characters.

In 150, the computing device can identify the state by, for example, recognizing the license plate design based on a template, recognizing the format of the character sequence (e.g. three letters then four numbers, where the first letter is an "A") based on statistics generated from prior training data, and/or recognizing a state logo within the license plate.

While the steps depicted in FIG. 1 have been described as performed in a particular order, the order described is merely exemplary, and various different sequences of steps can be performed, consistent with certain disclosed embodiments.

Further, the steps described are not intended to be exhaustive or absolute, and various steps can be inserted or removed.

Figure 2:
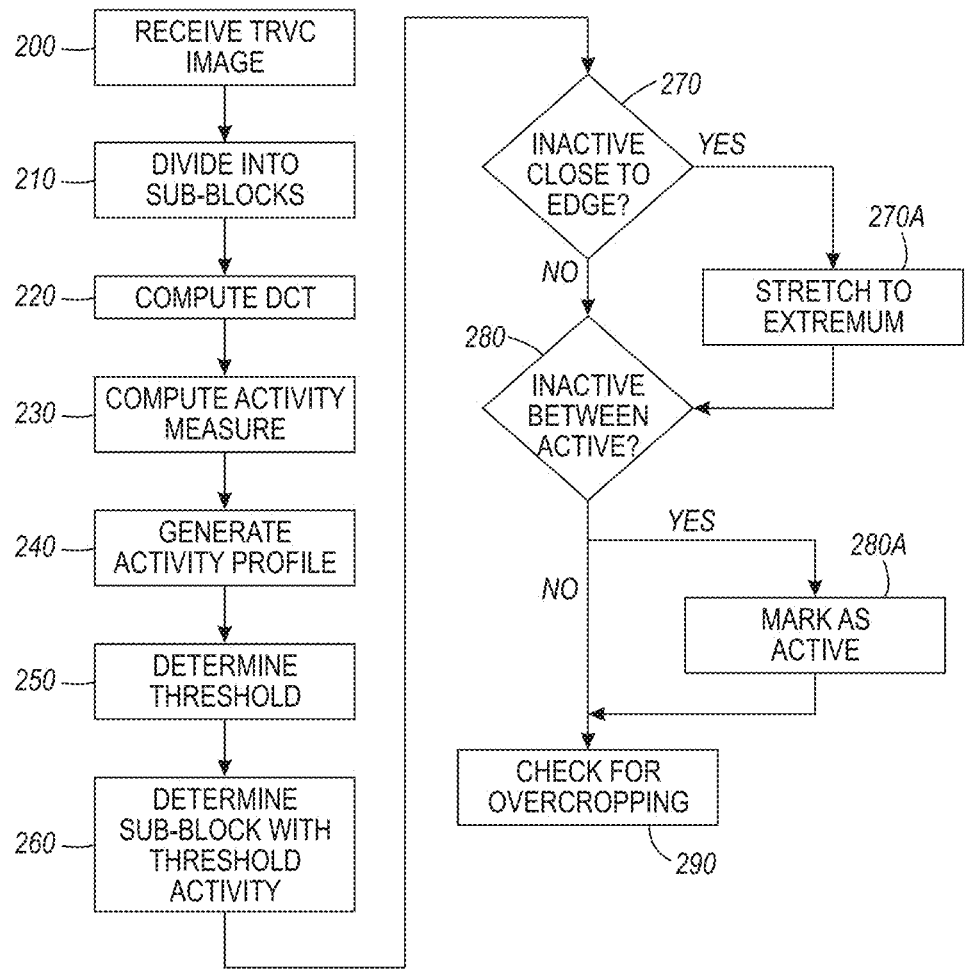
FIG. 2 is a flow diagram illustrating an exemplary method of performing horizontal cropping as part of extracting a tight bounding box for license plate recognition, consistent with certain disclosed embodiments.

FIG. 2 is a flow diagram illustrating an exemplary method of performing horizontal cropping as part of extracting a tight bounding box for license plate recognition, consistent with certain disclosed embodiments. For example, a computing device can perform the process depicted in FIG. 2 as part of the horizontal cropping 120C of the license plate recognition process depicted in FIG. 1.

The process can begin in 200 when a computing device receives, for example, a tilt removed and vertically cropped image (hereinafter, "TRVC image"). For example, the computing device can receive the result of tilt removal 120A and vertical cropping 120B from the license plate recognition process depicted in FIG. 1. In other embodiments, the described process can begin when an unaltered image from a traffic camera, a tilt removed image, a vertically cropped image, or an otherwise altered image is received.

In 210, the computing device can divide the received image into sub-blocks. For example, the computing device can divide the received image into N×N sub-blocks, where N is the height of the TRVC image. In other embodiments, the received image can be divided into sub-blocks that are not based on the height of the received image and/or sub-blocks of varying size and divided based on various algorithms.

In 220, the computing device can process each sub-block by, for example, performing a frequency analysis on each sub-block. In embodiments, the computing device can perform a two-dimensional discrete cosine transform (hereinafter, "DCT") within each sub-block, which results in coefficients for each block. The coefficients $C_{kl}$ resulting from a two dimensional type-II DCT applied to an image I can be given by the following formula:

$$C_{kl} = \alpha(k)\alpha(l)\sum_{k=0}^{N-1}\sum_{l=0}^{N-1} I_{ij}\cos\left[\frac{(2i+1)k\pi}{2N}\right]\cos\left[\frac{(2j+1)l\pi}{2N}\right]$$

In the above equation, $I_{ij}$ can represent the image pixel intensity value at coordinates (i, j) and the values of $\alpha(k)$ and $\alpha(l)$ can be computed according to the following formula:

$$\alpha(x) = \begin{cases} \sqrt{\frac{1}{N}} & \text{for } x = 0 \\ \sqrt{\frac{2}{N}} & \text{otherwise} \end{cases}$$

In other embodiments, DCT variants, such as type-I DCT, type-III DCT, and modified DCT can be utilized. In further embodiments, different frequency analysis processes and/or functions can be utilized, such as, for example, sine functions.

In 230, the computing device can compute a spatial activity measure for each sub-block. In embodiments, the computing device can use the results of a frequency analysis of a sub-block (220) to compute the spatial activity measure of the sub-block. For example, the computing device can compute spatial activity measure of a sub-block using the formula:

$$a_{ij} = \sum_{k \cdot l(k+l>0)} |C_{kl}|^2$$

In the above equation, $C_{kl}$ can represent the resultant coefficients of a two-dimensional DCT performed on a sub-block $B_{ij}$, and $a_{ij}$ can represent the spatial activity measure for the sub-block $B_{ij}$.

In 240, the computing device can generate an activity profile for the image. For example, the computing device can average spatial activity measures of the sub-blocks generated in 230 to generate a one-dimensional activity profile $p_j$ where j is the sub-block index.

In 250, the computing device can determine an activity threshold. In embodiments, the activity threshold can be determined using the one-dimensional activity profile $p_j$. For example, the activity threshold can selected to be a fixed fraction (e.g. 0.1) between the lowest and highest $p_j$ over the entire image.

In 260, the computing device can determine which sub-blocks have a spatial activity measure that is greater than the activity threshold determined in 250 (hereinafter, "active sub-block"). In embodiments, the sub-blocks with a spatial activity measure greater than the activity threshold can be stored separately and/or returned to a requester. In other embodiments, an index array can be associated with the sub-blocks, with each element of the index array associated with a different sub-block. Accordingly, each element of the index array can be set based on whether the associated sub-block has a spatial activity measure greater than the activity threshold. For example, a value of 1 can be set for each element associated with a sub-block that has a spatial activity measure greater than or equal to the activity threshold, and a value of 0 can set for each element associated with a sub-block that has a spatial activity measure less than the activity threshold hold (hereinafter, "inactive sub-block"). Additional data structures and/or element values or variables can be used to record which sub-blocks have a spatial activity measure greater than and/or equal to an activity threshold, consistent with disclosed embodiments.

In 270, the computing device can evaluate one or more sub-blocks that have less than a threshold amount of activity (determined in 260) to determine if the sub-block is near the edge of the image. For example, the computing device can determine that a sub-block is near the edge of the image by determining that the sub-block is adjacent to a sub-block that is on the edge of the image. In some embodiments, the computing device may only determine that a sub-bock is near an edge if the sub-block is adjacent to a sub-block that is smaller than the evaluated sub-block, if there is not a sub-block between the evaluated sub-block and the edge of the image, and/or if the sub-block adjacent to the evaluated sub-block is smaller than an N×N sub-block.

If the evaluated sub-block in 270 is near the edge of the image, the computing device can, in 270A, stretch the inactive area of the image from the sub-block to the extremum at the edge of the image. Accordingly, a sub-block between the evaluated sub-block or the undivided area between the edge of the image and the evaluated sub-block can be determined to have less than a threshold amount of activity without having to evaluate the area and/or sub-block. If the evaluated sub-block is not near the edge of the image, the computing device can evaluate another inactive sub-block in 270 or proceed to 280.

In 280, the computing device can evaluate one or more sub-blocks that have less than a threshold amount of activity (determined in 260) to determine if the inactive sub-block is between active sub-blocks. For example, the computing device can determine that an inactive sub-block is between active sub-blocks by determining that the inactive sub-block is between a first active sub-block on one side and a second active sub-block on the other side. In some embodiments, the computing device may only determine that a sub-block is between active sub-blocks if the inactive sub-block is adjacent to a first active sub-block on one side and adjacent to a second active sub-block on the other side, while, in further embodiments, the computing device may not requires the active sub-blocks to be adjacent for such a determination to be made.

If the inactive sub-block in 280 is between active sub-blocks, the computing device can, in 280A, mark the sub-block as active, regardless of the spatial activity measure of the sub-block. Accordingly, if a license plate includes a state logo in the middle of the plate and the sub-block surrounding the state logo is determined to be an inactive sub-block, the sub-block can be re-marked as active based on the sub-block position between two active sub-blocks that include license plate text.

In other embodiments, the computing device can lower the threshold level for evaluating whether the sub-block is inactive or active. For example, if a sub-block had less than the threshold level of activity in 260, but was near the threshold level, the sub-block may be re-marked as active if between two active sub-blocks. However, as an additional example, if the sub-block has a very low level of activity in 260, the sub-block may not be re-marked despite being between two active blocks. If the evaluated sub-block is not between active sub-blocks, the computing device can evaluate another inactive sub-blocks in 280 or proceed to store the resulting active sub-blocks.

The resulting active sub-blocks can be stored as a horizontally cropped version of the license plate image. In some embodiments, in 290, the computing device can evaluate the horizontally cropped version of the license plate image to ensure that the license plate has not been overcropped. For example, the computing device can compare the aspect ratio of the horizontally cropped version of the license plate to an expected license plate aspect ratio or a range of ratios. If the aspect ratios do not match, are off by an amount greater than a set threshold, and/or the aspect ratio of the horizontally cropped version of the license plate does not fall within the range of ratios, the computing device can determine that overcropping has occurred and return the TRVC image, or, in some embodiments, the computing device can add inactive sub-blocks to the horizontally cropped version of the license plate image. If the aspect ratios match, or are off by an amount less than (or equal) to a set threshold, the computing device can return only the horizontally cropped version of the license plate image. In further embodiments, the computing device can additional evaluate the horizontally cropped version of the license plate image to ensure that the license plate has not been undercropped.

Using the returned license plate image, the computing device can proceed with additional ALPR steps, as, for example, described above in reference to FIG. 1.

While the steps depicted in FIG. 2 have been described as performed in a particular order, the order described is merely exemplary, and various different sequences of steps can be performed, consistent with certain disclosed embodiments. Further, the steps described are not intended to be exhaustive or absolute, and various steps can be inserted or removed.

Figure 3:
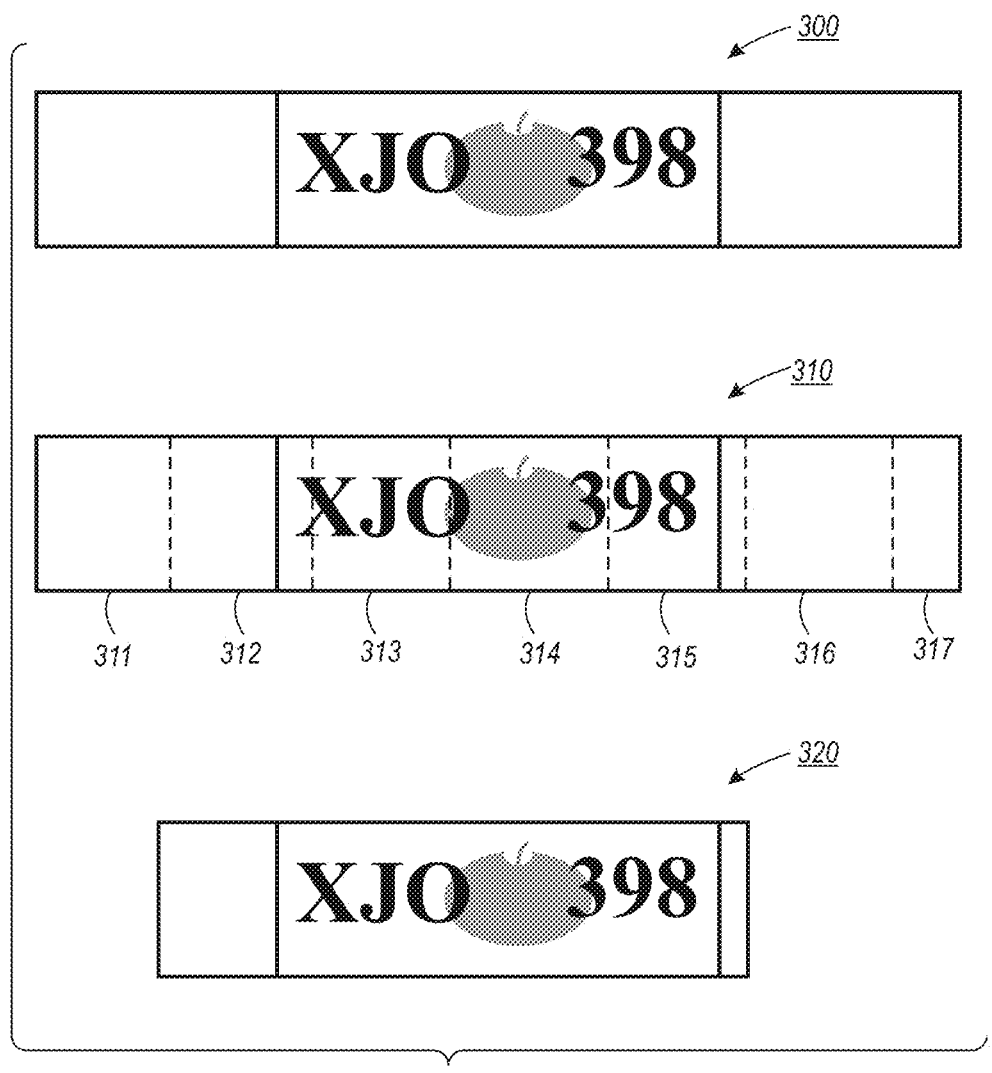
FIG. 3 is a diagram illustrating an exemplary sequence of images that represent a process of performing horizontal cropping as part of extracting a tight bounding box for license plate recognition, consistent with certain disclosed embodiments.

FIG. 3 is a diagram illustrating an exemplary sequence of images that represent a process of performing horizontal cropping as part of extracting a tight bounding box for license plate recognition, consistent with certain disclosed embodiments. FIG. 3 is intended merely for the purpose of illustration and is not intended to be limiting.

As depicted in FIG. 3, image 300 represents a TRVC image that can be produced as part of a process of extracting a tight bounding box in ALPR. For example, image 300 can represent an image of a license plate that has been localized, had the tilt removed, and has been vertically cropped (e.g. the TRVC image received in 200 of FIG. 2).

As further depicted in FIG. 3, a computing device can divide the TRVC image into sub-blocks 311, 312, 313, 314, 315, 316, and 317. For example, the sub-blocks (with the exception of sub-block 317) can be N×N, where N is the height of the TRVC image. In some embodiments, sub-block 317 may not be identified as a sub-block or can be identified as a partial sub-block.

The computing device can then perform a frequency analysis on each sub-block, compute a spatial activity measure for each sub-block, and generate an activity profile for the TRVC image (e.g. 220-240 of FIG. 2). The computing device can determine an activity threshold using the activity profile and then return sub-blocks with a threshold level of activity (e.g. 250-260 of FIG. 2).

As depicted in FIG. 3, sub-blocks 311, 316, and 317 may have little to no measured spatial activity. Accordingly, the spatial activity measure of sub-blocks 311, 316, and 317 may be less than an activity threshold. Therefore the computing device may only return sub-blocks 312, 313, 314, and 315, resulting in horizontally cropped image 320.

In some embodiments, the spatial activity of sub-block 317 may not be measured due to its position between inactive sub-block 316 and the edge of the image, due to its status as a partial sub-block, and/or due to not being identified as a sub-block. In such embodiments, sub-block 317 may be automatically marked as inactive if the inactive area of the TRVC image (e.g. sub-block 316) is stretch to the extremum at the edge of the image (e.g. 270A in FIG. 2).

Figure 4:
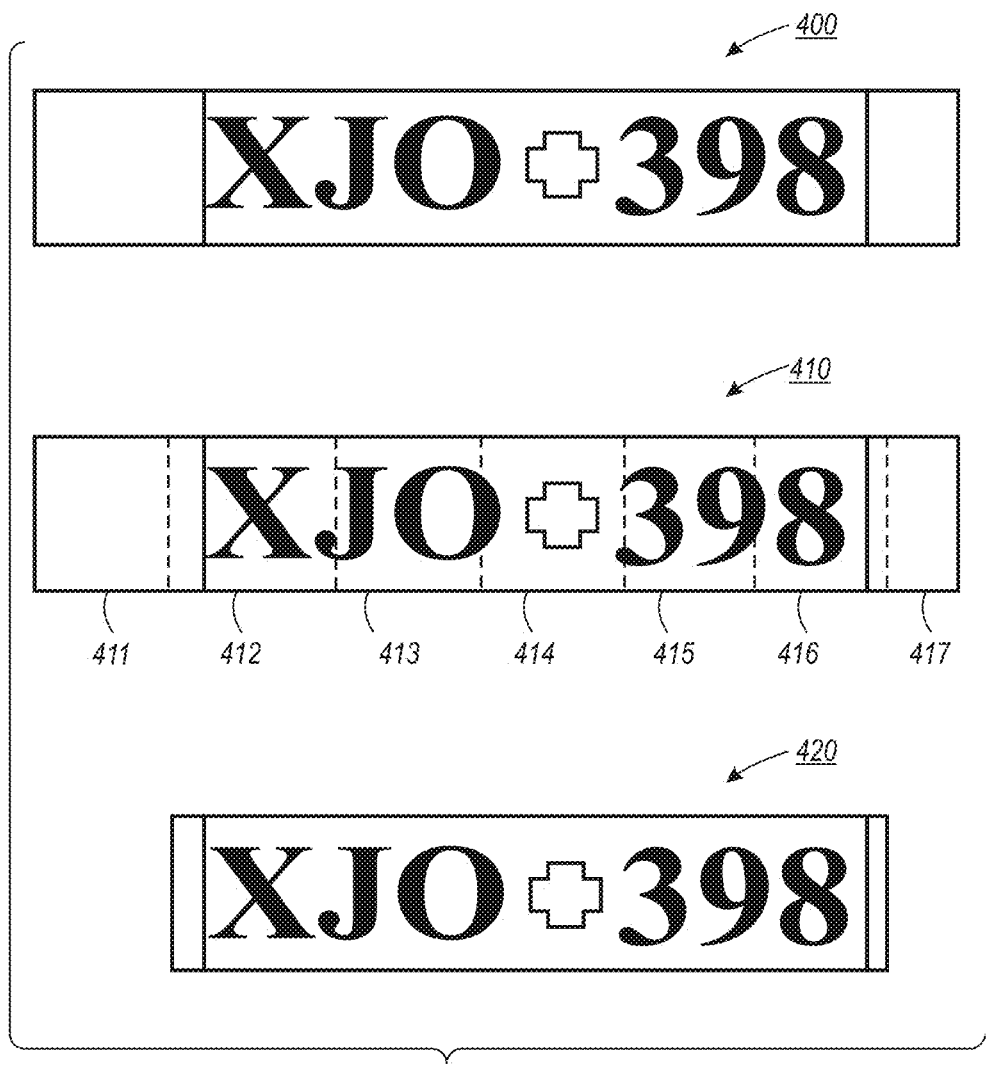
FIG. 4 is a diagram illustrating an exemplary sequence of images that represent a process of performing horizontal cropping as part of extracting a tight bounding box for license plate recognition, consistent with certain disclosed embodiments.

FIG. 4 is a diagram illustrating an exemplary sequence of images that represent a process of performing horizontal cropping as part of extracting a tight bounding box in ALPR, consistent with certain disclosed embodiments. FIG. 4 is intended merely for the purpose of illustration and is not intended to be limiting.

As depicted in FIG. 4, image 400 represents a TRVC image that can be produced as part of a process of extracting a tight bounding box in ALPR. For example, image 400 can represent an image of a license plate that has been localized, had the tilt removed, and has been vertically cropped (e.g. the TRVC image received in 200 of FIG. 2).

As further depicted in FIG. 4, a computing device can divide the TRVC image into sub-blocks 411, 412, 413, 414, 415, 416, and 417. For example, the sub-blocks (with the exception of sub-block 417) can be N×N, where N is the height of the TRVC image.

The computing device can then perform a frequency analysis on each sub-block, compute a spatial activity measure for each sub-block, and generate an activity profile for the TRVC image (e.g. 220-240 of FIG. 2). The computing device can determine an activity threshold using the activity profile and then return sub-blocks with a threshold level of activity (e.g. 250-260 of FIG. 2).

As depicted in FIG. 4, sub-blocks 411, 414, and 417 may have little to no measured spatial activity. Accordingly, the spatial activity measure of sub-blocks 411, 414, and 417 may be less than an activity threshold. Therefore, sub-blocks 412, 413, 415, and 416 can be marked as active sub-blocks and sub-blocks 411, 414, and 417 can be marked as inactive sub-blocks In some embodiments, the computing device can evaluate sub-block 414 and determine that inactive sub-block 414 is between active sub-block 413 and active sub-block 415. Accordingly, the computing device can change sub-block 414 from inactive to active (e.g. 280A in FIG. 2).

Therefore the computing device may only return sub-blocks 412, 413, 414, 415, and 416, resulting in horizontally cropped image 420.

Figure 5:
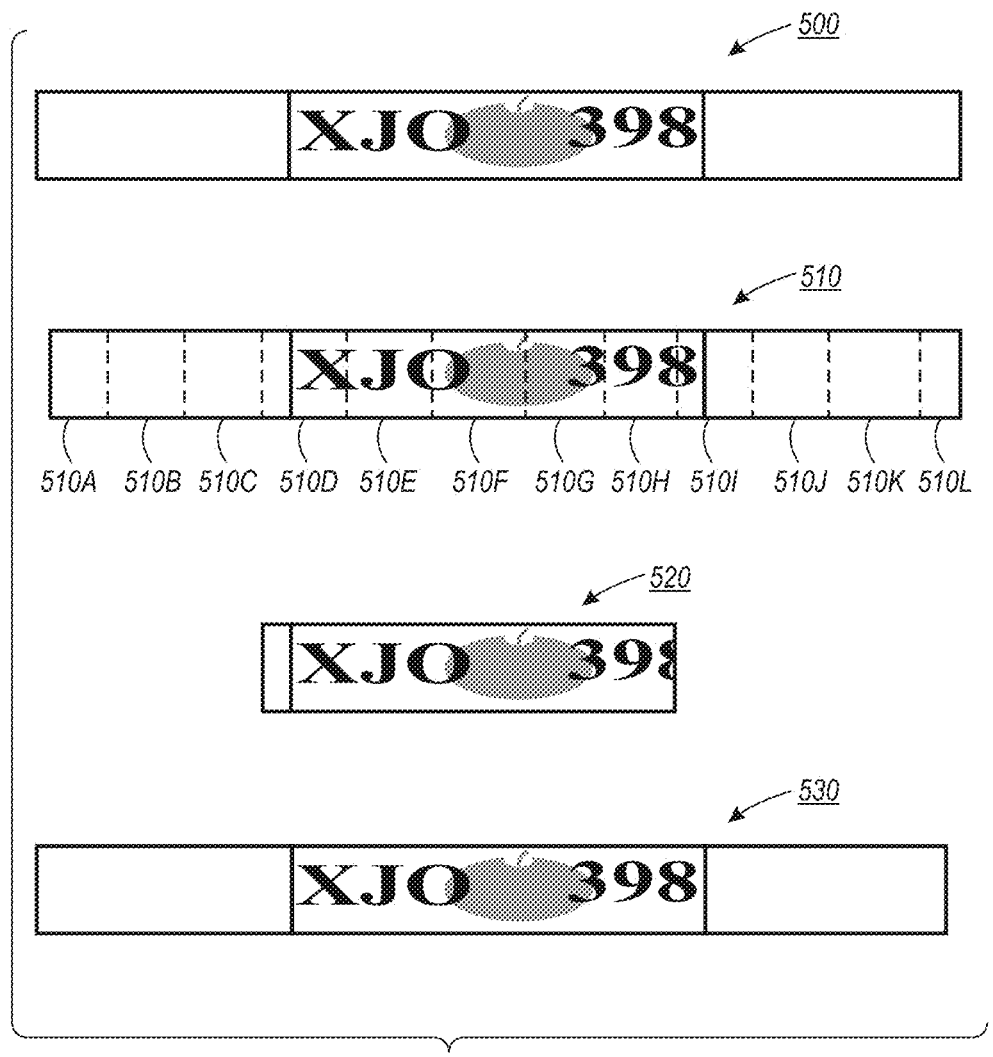
FIG. 5 is a diagram illustrating an exemplary sequence of images that represent a process of performing horizontal cropping as part of extracting a tight bounding box for license plate recognition, consistent with certain disclosed embodiments.

FIG. 5 is a diagram illustrating an exemplary sequence of images that represent a process of performing horizontal cropping as part of extracting a tight bounding box in ALPR, consistent with certain disclosed embodiments. FIG. 5 is intended merely for the purpose of illustration and is not intended to be limiting.

As depicted in FIG. 5, image 500 represents a TRVC image that can be produced as part of a process of extracting a tight bounding box in ALPR. For example, image 500 can represent an image of a license plate that has been localized, had the tilt removed, and has been vertically cropped (e.g. the TRVC image received in 200 of FIG. 2).

As further depicted in FIG. 5, a computing device can divide the TRVC image into sub-blocks 510A, 510B, 510C, 510D, 510E, 510F, 510G, 510H, 510I, 510J, 510K, and 510L. For example, the sub-blocks (with the exception of sub-block 510L) can be N×N, where N is the height of the TRVC image.

The computing device can then perform a frequency analysis on each sub-block, compute a spatial activity measure for each sub-block, and generate an activity profile for the TRVC image (e.g. 220-240 of FIG. 2). The computing device can determine an activity threshold using the activity profile and then return sub-blocks with a threshold level of activity (e.g. 250-260 of FIG. 2).

As depicted in FIG. 5, sub-blocks 510A, 510B, 510C, 510J, 510K, and 510L may have little to no measured spatial activity. Accordingly, the spatial activity measure of sub-blocks 510A, 510B, 510C, 510J, 510K, and 510L may be less than an activity threshold. Additionally, for the purposes of this example, sub-block 510I may also be determined to have a spatial activity measure less than the activity threshold. Therefore, sub-blocks 510D, 510E, 510F, 510G, and 510H can be marked as active sub-blocks and sub-blocks 510A, 510B, 510C, 510I, 510J, 510K, and 510L can be marked as inactive sub-blocks Therefore, the inactive sub-blocks can be removed, resulting in horizontally cropped image 520.

The computing device can evaluate the horizontally cropped image to ensure that the license plate has not been overcropped. The computing device can compare the aspect ratio of the horizontally cropped image to an expected license plate aspect ratio or a range of ratios. For example, an expected license plate aspect ratio can be 0.2 for a particular jurisdiction and/or a range of expected license plate aspect ratios can be between 0.195 and 0.205. Accordingly, the computing device can evaluate the aspect ratio of image 520 and determine that the aspect ratio is larger than 0.2 (and/or 0.205). Therefore, the computing device can determine that overcropping has likely occurred and return image 530 instead of horizontally cropped image 520, which is the same image as TRVC image 500.

Figure 6:
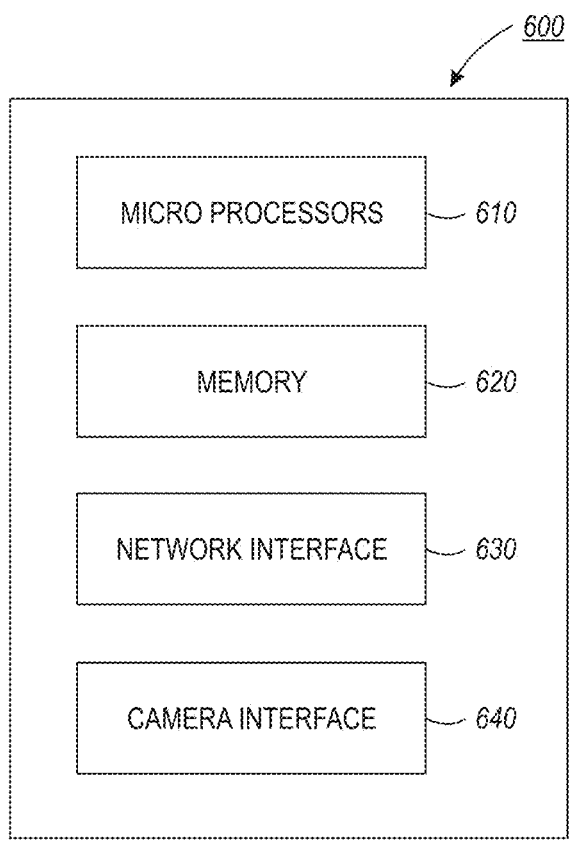
FIG. 6 is a diagram illustrating an exemplary hardware system for cropping images for license plate recognition, consistent with certain disclosed embodiments.

FIG. 6 is a diagram illustrating an exemplary hardware system for cropping images for license plate recognition, consistent with certain disclosed embodiments. Computing device 600 may represent any type of one or more computing devices.

Computing device 600 may include, for example, one or more microprocessors 610 of varying core configurations and clock frequencies; one or more memory devices or computer-readable media 620 of varying physical dimensions and storage capacities, such as flash drives, hard drives, random access memory, etc., for storing data, such as images, files, and program instructions for execution by one or more microprocessors 610; etc. One or more microprocessors 610, and one or more memory devices or computer-readable media 620 may be part of a single device as disclosed in FIG. 6 or may be contained within multiple devices. Those skilled in the art will appreciate that the above-described componentry is exemplary only, as computing device 600 may comprise any type of hardware componentry, including any necessary accompanying firmware or software, for performing the disclosed embodiments. Further, computing device 600 can include, for example, video camera interface 640 for communication with one or more video cameras. For example, computing device can receive images from a traffic camera via video camera interface 640. Additionally or alternatively, computing device 600 can include, for example, network interface 630 for communicating with one or more additional computing devices. For example, computing device can, via network interface 630, receive images that include depictions of licenses plates from the one or more additional computing devices, receive TRVC images from the one or more computing devices, transmit license plate information to the one or more computing devices, transmit horizontally cropped images to the one or more computing devices, etc.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:
1. A method comprising:
obtaining an image comprising license plate information;
dividing the image into a plurality of sub-blocks;
computing a spatial activity measure for each sub-block of the plurality of sub-blocks, wherein the spatial activity measure includes a two-dimensional discrete cosine transform (DCT);
generating a one-dimensional activity profile for the image based on the spatial activity measure for each sub-block;
determining an activity threshold based on a predetermined percentage;

determining that a sub-block of the plurality of sub-blocks is an active sub-block by comparing the spatial activity measure for the sub-block with the activity threshold;

generating, using one or more processors, a second image of the license plate information, wherein the second image comprises the active sub-block; and obtaining the license plate information based on the second image.

2. The method of claim 1, wherein, prior to obtaining the image, the image is generated by vertically cropping a third image comprising the license plate information.

3. The method of claim 1, wherein, prior to obtaining the image, the image is generated by removing tilt from a third image comprising the license plate information.

4. The method of claim 1, further comprising performing a frequency analysis on each sub-block of the plurality of sub-blocks, wherein the spatial activity measure for each sub-block is based on the frequency analysis of that sub-block.

5. The method of claim 1, further comprising determining that a second sub-block of the plurality of sub-blocks is inactive, wherein:

the spatial activity measure of the second sub-block is less than the activity threshold; and the second sub-block is determined to be inactive based on the second sub-block being between the active sub-block and a third active sub-block in the image.

6. The method of claim 1, further comprising determining that a second sub-block of the plurality of sub-blocks is an inactive sub-block by comparing the spatial activity measure for the second sub-block with the activity threshold, wherein the second image does not comprise the inactive sub-block.

7. The method of claim 6, further comprising determining that a third sub-block of the plurality of sub-blocks is an inactive sub-block by determining that the third sub-block is between the inactive sub-block and an edge of the image.

8. The method of claim 1, further comprising determining that a second sub-block of the plurality of sub-blocks is active, wherein:

the spatial activity measure of the second sub-block is less than the activity threshold; and the second sub-block is determined to be active based on the second sub-block being between the active sub-block and a third active sub-block in the image.

9. The method of claim 1, further comprising:

determining a third image of the license plate comprising only active sub-blocks;

determining that the third image is overcropped with respect the license plate information based on comparing a ratio of the third image with an expected license plate ratio; and wherein, the second image additionally comprises one or more inactive sub-blocks.

10. The method of claim 1, wherein the spatial activity measure is computed using the formula:

$$a_{ij} = \sum_{k \cdot l(k+l>0)} |C_{kl}|^2$$

wherein $C_{kl}$ represents resultant coefficients of a two-dimensional DCT performed on a sub-block $B_{ij}$, and $a_{ij}$ represents the spatial activity measure for the sub-block $B_{ij}$.

11. A system comprising:

a processing system comprising one or more processors; and a memory system comprising one or more computer-readable media, wherein the one or more computer-readable media contain instructions that, when executed by the processing system, cause the processing system to perform operations comprising:

obtaining an image comprising license plate information;

dividing the image into a plurality of sub-blocks;

computing a spatial activity measure for each sub-block of the plurality of sub-blocks, wherein the spatial activity measure includes a two-dimensional discrete cosine transform (DCT);

generating a one-dimensional activity profile for the image based on the spatial activity measure for each sub-block;

determining an activity threshold based on a predetermined percentage;

determining that a sub-block of the plurality of sub-blocks is an active sub-block by comparing the spatial activity measure for the sub-block with the activity threshold;

generating, using one or more processors, a second image of the license plate information, wherein the second image comprises the active sub-block; and obtaining the license plate information based on the second image.

12. The system of claim 11, wherein, prior to obtaining the image, the image is generated by vertically cropping a third image comprising the license plate information.

13. The system of claim 11, wherein, prior to obtaining the image, the image is generated by removing tilt from a third image comprising the license plate information.

14. The system of claim 11, the operations further comprising performing a frequency analysis on each sub-block of the plurality of sub-blocks, wherein the spatial activity measure for each sub-block is based on the frequency analysis of that sub-block.

15. The system of claim 11, the operations further comprising determining that a second sub-block of the plurality of sub-blocks is inactive, wherein:

the spatial activity measure of the second sub-block is less than the activity threshold; and the second sub-block is determined to be inactive based on the second sub-block being between the active sub-block and a third active sub-block in the image.

16. The system of claim 11, the operations further comprising determining that a second sub-block of the plurality of sub-blocks is an inactive sub-block by comparing the spatial activity measure for the second sub-block with the activity threshold, wherein the second image does not comprise the inactive sub-block.

17. The system of claim 16, the operations further comprising determining that a third sub-block of the plurality of sub-blocks is an inactive sub-block by determining that the third sub-block is between the inactive sub-block and an edge of the image.

18. The system of claim 11, the operations further comprising determining that a second sub-block of the plurality of sub-blocks is active, wherein:

the spatial activity measure of the second sub-block is less than the activity threshold; and the second sub-block is determined to be active based on the second sub-block being between the active sub-block and a third active sub-block in the image.

19. The system of claim 11, the operations further comprising:
  determining a third image of the license plate comprising only active sub-blocks;
  determining that the third image is overcropped with respect the license plate information based on comparing a ratio of the third image with an expected license plate ratio; and
  wherein, the second image additionally comprises one or more inactive sub-blocks.

20. The system of claim 11, wherein the spatial activity measure is computed using the formula:

$$a_{ij} = \sum_{k \cdot l(k+l>0)} |C_{kl}|^2$$

wherein $C_{kl}$ represents resultant coefficients of a two-dimensional DCT performed on a sub-block $B_{ij}$, and $a_{ij}$ represents the spatial activity measure for the sub-block $B_{ij}$.

* * * * *